United States Patent
Santhosh et al.

(10) Patent No.: US 8,762,113 B2
(45) Date of Patent: Jun. 24, 2014

(54) METHOD AND APPARATUS FOR LOAD TESTING ONLINE SERVER SYSTEMS

(75) Inventors: Sreelata Santhosh, Carlsbad, CA (US); Mark Vaden, San Diego, CA (US); Brian Fernandes, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 369 days.

(21) Appl. No.: 13/153,271

(22) Filed: Jun. 3, 2011

(65) Prior Publication Data

US 2012/0311387 A1 Dec. 6, 2012

(51) Int. Cl.
G06F 9/445 (2006.01)

(52) U.S. Cl.
USPC ............. 703/2; 703/16; 703/21; 709/208; 714/38.1; 714/741

(58) Field of Classification Search
USPC ........... 703/2, 16, 21; 714/741, 38.1; 709/208
See application file for complete search history.

(56) References Cited

U.S. PATENT DOCUMENTS

| | | | | |
|---|---|---|---|---|
| 5,862,366 A * | 1/1999 | Schmidt et al. | | 703/21 |
| 6,167,534 A * | 12/2000 | Straathof et al. | | 714/38.1 |
| 7,028,225 B2 * | 4/2006 | Maso et al. | | 714/47.2 |
| 7,047,446 B1 * | 5/2006 | Maurer et al. | | 714/38.1 |
| 7,085,814 B1 * | 8/2006 | Gandhi et al. | | 709/208 |
| 7,350,124 B2 * | 3/2008 | Gloekler et al. | | 714/741 |
| 7,526,685 B2 * | 4/2009 | Noy et al. | | 714/47.2 |
| 2003/0192032 A1 * | 10/2003 | Andrade et al. | | 717/124 |
| 2006/0039538 A1 * | 2/2006 | Minnis et al. | | 379/1.01 |
| 2006/0117055 A1 * | 6/2006 | Doyle | | 707/102 |
| 2007/0006036 A1 * | 1/2007 | Devas et al. | | 714/38 |

* cited by examiner

*Primary Examiner* — Thai Phan
(74) *Attorney, Agent, or Firm* — Fitch, Even, Tabin & Flannery, LLP

(57) ABSTRACT

A method includes capturing data that is representative of actions performed by each of a plurality of human user operated clients as they interact with an online software application, loading at least one or more portions of the captured data into one or more automated simulation clients, and using the one or more automated simulation clients to perform load testing of an online server system. A system includes a data capturing stage, one or more automated simulation clients, and a configuration stage. A computer readable storage medium stores one or more computer programs that will cause a processor based system to execute steps including receiving data that was captured during a running of an online software application and that is representative of actions performed by each of a plurality of human user operated clients as they interacted with the online software application, and loading at least one or more portions of the data into one or more automated simulation clients that are configured to perform load testing of an online server system.

33 Claims, 9 Drawing Sheets

| CAPTURED DATA 400 | CORRESPONDING ACTION/EVENT TYPE 402 | CORRESPONDING CLIENT 404 |
|---|---|---|
| (DATA) | --------> CONNECT | ------>1$^{ST}$ HUMAN USER OPERATED CLIENT 406 |
| (DATA) | --------> SEND MESSAGE | |
| (DATA) | --------> GAME PLAY | |
| (DATA) | --------> DISCONNECT | |
| (DATA) | --------> CONNECT | ------>2$^{ND}$ HUMAN USER OPERATED CLIENT 408 |
| (DATA) | --------> DISCONNECT | |
| (DATA) | --------> CONNECT | ------>3$^{RD}$ HUMAN USER OPERATED CLIENT 410 |
| (DATA) | --------> SEND MESSAGE | |
| (DATA) | --------> DISCONNECT | |
| ⋮ | ⋮ | ⋮ |

FIG. 4

```
private int n;

private dme_service *repeat_obj;
```

```
void my_action( )
{
    for i = 1 to n
        repeat_obj->action( );

return;
}
```

**Concrete Class
REPEAT**

```
private int num_milliseconds;
```

```
void my_action ( )
{ sleep ( num_milliseconds) ;
        return;
}
```

**Concrete Class
WAIT**

FIG. 9

METHOD AND APPARATUS FOR LOAD TESTING ONLINE SERVER SYSTEMS

BACKGROUND OF THE INVENTION

1. Field of the Invention

The present invention relates generally to online computer software applications, such as online computer games and online gaming, and more specifically to the testing of such online computer software applications.

2. Discussion of the Related Art

Computer games, such as video games, have become a popular source of entertainment. Computer games are typically implemented in computer game software applications and are often run on game consoles, entertainment systems, desktop, laptop, and notebook computers, portable devices, etc.

An online game is a game played over a computer network, typically the Internet. Online games allow players (also referred to herein as users) who are physically remote from each other, often in different parts of the world, to participate in the same game. As such, many online games comprise multi-user systems, which are often built using a client/server model, such as web servers.

SUMMARY OF THE INVENTION

One embodiment provides a method, comprising: capturing data that is representative of actions performed by each of a plurality of human user operated clients as they interact with an online software application, wherein the capturing data is performed by one or more processor based apparatuses; loading at least one or more portions of the captured data into one or more automated simulation clients; and using the one or more automated simulation clients to perform load testing of an online server system.

Another embodiment provides a system, comprising: a data capturing stage that is configured to capture data that is representative of actions performed by each of a plurality of human user operated clients as they interact with an online software application; one or more automated simulation clients that are configured to perform load testing of an online server system; and a configuration stage that is configured to load at least one or more portions of the captured data into the one or more automated simulation clients; wherein the data capturing stage, the one or more automated simulation clients, and the configuration stage are implemented by one or more processor based apparatuses.

Another embodiment provides one or more computer readable storage mediums storing one or more computer programs that will cause a processor based system to execute steps comprising: capturing data that is representative of actions performed by each of a plurality of human user operated clients as they interact with an online software application; loading at least one or more portions of the captured data into one or more automated simulation clients; and using the one or more automated simulation clients to perform load testing of an online server system.

Another embodiment provides a computer readable storage medium storing one or more computer programs that will cause a processor based system to execute steps comprising: receiving data that was captured during a running of an online software application and that is representative of actions performed by each of a plurality of human user operated clients as they interacted with the online software application; and loading at least one or more portions of the data into one or more automated simulation clients that are configured to perform load testing of an online server system.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIG. 4 is a block diagram illustrating categorization of data in accordance with an embodiment of the present invention;

FIG. 9 is a diagram illustrating examples of a REPEAT class and a WAIT class in accordance with an embodiment of the present invention;

DETAILED DESCRIPTION

Figure 1:
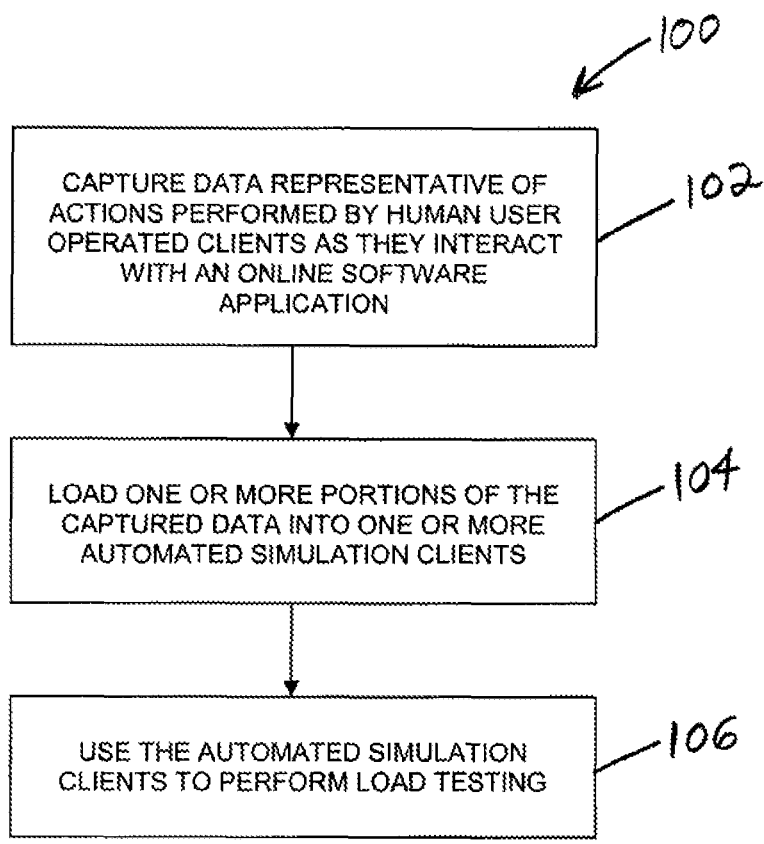
FIG. 1 is a flow diagram illustrating a method in accordance with an embodiment of the present invention.

As mentioned above, online games allow players who are physically remote from each other, often in different parts of the world, to participate in the same game. With such a large pool of potential players (also referred to herein as users) it is often difficult to predict how many players will attempt to play a particular game. Many games become quite popular and attract huge numbers of potential players. If too many players attempt to play a game, the online server system supporting the game can become overloaded and function improperly or even crash altogether. As such, it is often prudent to test such systems to determine their capacity and how the systems will behave under normal and peak conditions.

One way to test an online game and its corresponding online server system is through the use of load testing. Load testing is a process that generally involves placing a load on the online server system beyond the normal usage patterns to test the online server's response at unusually high or peak loads. Load testing is important to ensure properties such as predictable performance, continuous availability, end-to-end dependability, and scalability meet required standards.

Previous and current techniques for load testing a game for online play are typically broken up into many disconnected manual processes and can be as complex as the software title development process itself. Indeed, it is often quite a challenging task to load test game titles (irrespective of game genre) for online game play to ensure the above-mentioned properties meet required standards. Furthermore, the game title developer often has little or no time left at the end of the development lifecycle to complete a full suite of hand written client simulations that attempt to predict the client behavior.

Load test simulations are preferably made as accurate and realistic as possible. However, some of the current techniques for load testing require client simulations to be custom written based on the testing personnel's prediction of how real human players will play the game. Such predictions are often based only on the testing personnel's best estimations or even guess work. As such, the predictions often turn out to be wrong or inaccurate and not representative of how real human players will play the games. This is because real human players will often behave or play the games in ways not anticipated by the testing personnel. When the predictions of the player actions are not accurate, the load test fails to be realistic, which means the results of any such load test are suspect.

Other disadvantages of current load testing techniques include that the client simulations must often be written by hand and are customized to the particular game being tested and are therefore limited to use with the particular game being tested. Furthermore, intricate knowledge of the game code written by the game developer is often needed to write the client simulations. And if the game code is later modified, then appropriate modifications must also be made to the client simulation. These factors can increase the time required to write the client simulations, which in turn increases the cost of the load testing.

One way to perform load testing is by first attempting to run packet captures of actual game play using network sniffers. Next, a state machine is derived from this data to understand the pattern and frequency of the application programming interface (API) calls exercised on the servers. Client simulations are then written and fed into a load test framework which are run against the servers to test behavior.

Embodiments of the present invention provide a mechanism that automates the process of simulating accurate load tests for any game title, irrespective of genre, thereby significantly reducing the time to market. The process provides for more automated load testing at least partly because the testing personnel (referred to herein as "testers") do not necessarily need to have intricate knowledge of the game code written by the game developer as with other techniques. In some embodiments, the client simulations described herein can be used with different online games and different load tests without having to be rewritten. And if the code for an online game or online software application being tested is changed or modified, the automated simulation clients described herein can continue to be used without having to rewrite or modify their underlying program code.

The embodiments described herein are believed to provide for accurate and realistic load test simulations. As such, use of the embodiments described herein can help call attention to adjustments or modifications that can be made to lower the risk of problems when the online servers handle the high player counts encountered, typically immediately after game launch or after release of key game patches. Furthermore, use of the embodiments described herein can help to ensure properties such as predictable performance, continuous availability, end-to-end dependability, and scalability of an online software application meet required standards.

In general, some of the embodiments of the present invention operate by allowing testers to capture real game play data through a telemetry system, and then use some or all of the captured real game play data to feed load test simulators. This automates the creation of complex and general test scenarios. In some embodiments, any sequence of test actions involving the services of the game server can be run so that a range of different types of tests can be performed. For example, some of the different types of tests that can be performed include soak tests, stress tests, and denial of service attacks. Furthermore, the underlying program code for the automated simulation clients (described below) does not have to be modified or rewritten when load testing different online games or when running different load tests. In some embodiments, tests are reproducible and accurate and can be fed directly to the load test framework with a graphical user interface.

Some of the embodiments described herein are described with respect to the load testing of online games. It should be understood that the methods and techniques described herein may be applied to online games that are based on any platform. For example, the methods and techniques may be applied to game console driven online gaming, or to online games that are run on any other platform, such as entertainment systems, desktop, laptop, and notebook computers, portable devices, etc.

Furthermore, it should be understood that the methods and techniques described herein may also be applied to any other type of online computer software application and not just online games. Namely, in addition to online games, there are many other types of online computer software applications that comprise multi-user systems and that are built using a client/server model. Some of the embodiments, methods, and techniques described herein may be used for load testing these other types of online computer software applications.

Referring to FIG. 1, there is illustrated an example of a method 100 in accordance with an embodiment of the present invention. The method 100 may be used for load testing any type of online computer software application, such as for example online computer games. In some embodiments, the method 100 may be used to automate load testing simulation for online software applications based on any type of platform. The method 100 is believed to provide for accurate and realistic load test simulations.

The method 100 begins in step 102 in which data is captured. The data that is captured is representative of actions performed by each of a plurality of human user operated clients as they interact with an online software application. A human user operated client refers to a client, such as a game console, computer, device, or other client, that is operated by a real human user or player. In some embodiments, the online software application may comprise an online game. For example, in some embodiments where the online software application comprises an online game, this step is used to capture accurate real user game play data. That is, an online game is run with real human users playing the game. A human user typically plays the game by operating a client, such as a game console or computer, to interact with the game. During the game, data is captured that is representative of the actions performed by each of users as they play the game. Examples of some of the types of actions that are typically performed by the users include connecting to the game, disconnecting from the game, sending a message, engaging in game play, etc.

Because the data is captured from real game play, it provides for a realistic and accurate simulation when used later during load testing (discussed below). In some embodiments, the data capturing of step 102 may be performed during real beta and/or quality assurance (QA) testing phases. The game play that occurs during these testing phases is believed to be a good representation of how real users will play the game after it is released. In some embodiments, a beta test may provide better data than a QA test since beta tests often have over a thousand players, whereas a QA test may only have 100 or so players. But it should be understood that the data capturing of step 102 may be performed during any running of the online software application in which real human users operate clients to interact with the online software application. Furthermore, as will be discussed below, in some embodiments step 102 may be performed by one or more processor based apparatuses.

In some embodiments, step 102 may comprise two steps. For example, an online software application may be run in which a plurality of human user operated clients interact with the online software application. Then, data is captured that is representative of actions performed by each of the human user operated clients during the running of the online software application.

The real game play data is captured in order to distribute one or more portions of it to one or more automated simulation clients. This is indicated by step 104 in which at least one or more portions of the captured data is loaded into one or more automated simulation clients. An automated simulation client is a client that is controlled by software and which is intended to simulate a human user operated client during load testing. As such, an automated simulation client is not operated by a human user during load testing. The various portions of the captured data are loaded into the automated simulation clients in order to specify the behavior or profile of each automated simulation client. That is, portions of the recorded captured data are imported into each automated simulation client, and the recorded captured data defines the behavior or profile of each automated simulation client. In some embodiments, automated simulation clients may be implemented via software on one or more processor based apparatuses.

In step 106 the one or more automated simulation clients are used to perform load testing of an online server system. Load testing is performed by allowing the automated simulation clients to interact with an online software application, such as an online game, that is hosted by the online server system. The automated simulation clients simulate a load being placed on the online server system. Each of the automated simulation clients will operate according to the behavior specified by the portions of the captured data that it has received. That is, during load testing, the automated simulation clients will perform at least some of the same actions performed by the real human user operated clients. Those actions will be performed according to the corresponding portions of the captured data, which means the actions will be performed in the same or substantially same manner that they were performed by the real human user operated clients. As such, distributing the captured data to many hosts helps to mimic the load put on the online server to simulate loads place on production servers.

Thus, in some embodiments, portions of real data generated by real users is used to configure the behavior or profile of automated simulation clients that are used to simulate a load during load testing. Because the behavior of the automated simulation clients is defined by the portions of the captured data loaded into them, the underlying program code for the automated simulation clients does not have to be modified or rewritten when load testing different online games or when running different load tests. Furthermore, if the code for an online game or online software application being tested is changed or modified, the automated simulation clients can continue to be used without having to rewrite or modify their underlying program code.

Figure 2:
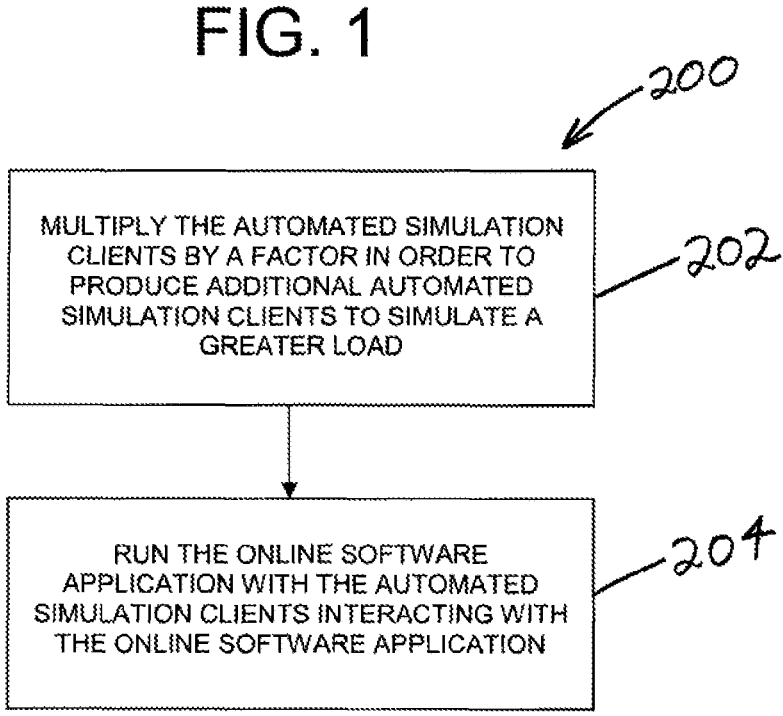
FIG. 2 is a flow diagram illustrating a method in accordance with an embodiment of the present invention.

In some embodiments, step 106 may comprise one or more of the steps shown in FIG. 2, which illustrates an example of a method 200 in accordance with an embodiment of the present invention. Specifically, in step 202 the one or more automated simulation clients are multiplied by a factor in order to produce additional automated simulation clients to simulate a greater load. For example, the number of automated simulation clients may be multiplied by any factor, such as for example 5×, 10×, 100×, 1000×, etc., in order to increase the number of automated simulation clients. The multiplying results in additional automated simulation clients being produced that are based on the original automated simulation clients. In some embodiments, each original automated simulation client produces a number of additional automated simulation clients equal to the factor.

The ability to increase the number of automated simulation clients means that the tests are scalable. This scalability allows testing personnel to test the online server's response to various differing size loads, such as at expected normal usage patterns to unusually high or peak loads. In some embodiments, the process of multiplying/scaling the number of automated simulation clients is performed automatically, which is referred to herein as auto-scaling. In some embodiments, the process of multiplying/scaling is performed manually. In some embodiments, the process of multiplying/scaling is performed by a configuration server (discussed below).

In some embodiments, the process of multiplying/scaling the number of automated simulation clients is linear. That is, in such embodiments, multiplying the number of automated simulation clients means that each of the original automated simulation clients will be duplicated or replicated, such that exact copies are made. As such, the duplicate automated simulation clients will all have the same behavior and perform the same actions. In some embodiments, where the multiplying/scaling is linear, the multiplying/scaling may be performed automatically, such as by a configuration server (discussed below). That is, in some embodiments, the process of creating exact copies of the original automated simulation clients is performed automatically. Because the behavior of each of the original automated simulation clients is based on the data captured from real game play, duplicating that behavior is believed to provide a more realistic simulation than previous load testing techniques where there is an attempt to predict such behavior.

In some embodiments, the process of multiplying/scaling the number of automated simulation clients is non-linear. That is, in such embodiments the multiplying/scaling may include introducing small changes in the behavior of the additional automated simulation clients with respect to the corresponding originals so that they are not purely duplicated. Small changes may be introduced in a variety of ways, such as for example by changing the frequency that actions are performed, the types of actions performed, the manner in which actions are performed, etc. Furthermore, different changes may be made to each of the additional automated simulation clients, or to groups of the additional automated simulation clients. In some embodiments, the changes made to the behavior of the additional automated simulation clients may be more significant than small changes. Introducing changes can help to provide variety among the behaviors of the additional automated simulation clients.

In some embodiments, where the multiplying/scaling is non-linear, the changes in the behavior of the additional automated simulation clients may be made by fine-tuning or tweaking portions of the captured data included in each additional automated simulation client. Such fine-tuning or tweaking may be performed manually or automatically. In some embodiments where the fine-tuning or tweaking is performed automatically, program code, modules, or subroutines may be used to automatically make the changes to the captured data included in each additional automated simulation client during the multiplying/scaling process. By way of example, the changes may be predetermined changes, random changes, changes made according to an algorithm, etc. In some embodiments, the fine-tuning or tweaking may be performed by a configuration server (discussed below).

The ability to scale the automated simulation clients means that actual, real data can be captured for an online software application, and then the captured real data can effectively be scaled up for a load test by scaling up the number of automated simulation clients used in the load test. This allows the system to be tested at different and greater loads. Thus, in some embodiments, portions of real data generated by real users is used to configure the behavior of automated simulation clients that are used to simulate a load during load testing, and the number of automated simulation clients is scaled up to simulate greater loads during load testing. Furthermore, the underlying program code for the automated simulation clients does not have to be modified or rewritten to perform the scaling.

Next, in step 204, load testing may be performed by running the same online software application that was run when the data was captured from the real human user operated clients. This means that during the load test the one or more automated simulation clients will interact with that same online software application. This is believed to provide a realistic simulation of that online software application since the behaviors of the automated simulation clients should closely match how the real players interacted with the same online software application.

Figure 3:
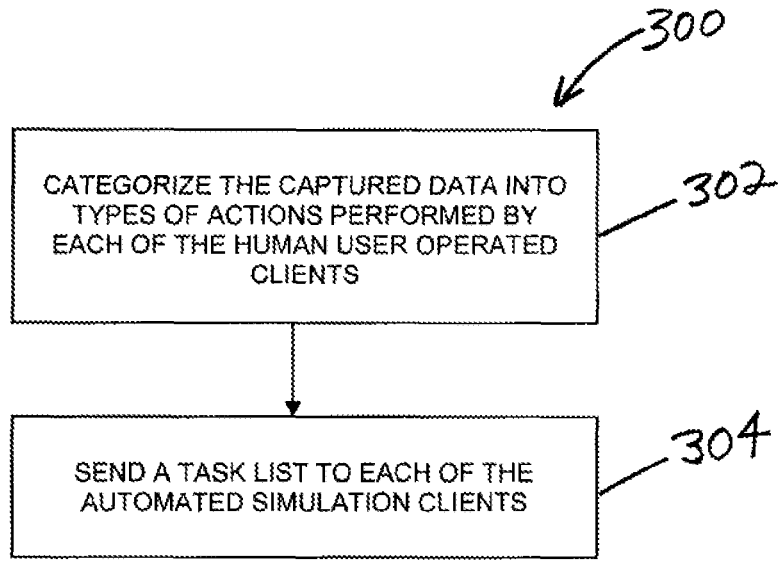
FIG. 3 is a flow diagram illustrating a method in accordance with an embodiment of the present invention.

In some embodiments, the method 100 of FIG. 1 may further comprise one or more of the steps shown in FIG. 3, which illustrates an example of a method 300 in accordance with an embodiment of the present invention. Specifically, in step 302 the captured data is categorized into types of actions performed by each of the human user operated clients. By way of example, some of the types of actions, which may also be referred to as event types, may include connect, disconnect, send message, game play, etc.

FIG. 4 illustrates an example categorization of the captured data in accordance with an embodiment of the present invention. Specifically, the captured data 400 is categorized into the corresponding action/event types 402. Namely, for each portion of the captured data 402, the corresponding action/event type 402 is listed. In some embodiments, the categorization further includes an indication of the human user operated client 404 that performed each action/event type 402. Thus, the captured data 400 includes captured data 406 for a first of the human user operated clients, captured data 408 for a second of the human user operated clients, captured data 410 for a third of the human user operated clients, and so on. The captured data for each of the human user operated clients is categorized into the types of actions or events that were performed by that particular human user operated client. As shown, some of the types of actions/events include connect, disconnect, send message, game play, etc. As illustrated, the second of the human user operated clients performed only connect and disconnect actions. The portion of the captured data corresponding to a particular type of action will cause that action to be performed by an automated simulation client in the same manner it was performed by the human user operated client.

In some embodiments, the captured data may first be summarized before being categorized. For example, in some embodiments where the online software application comprises an online game, game traffic summary data (or information) may first be extracted from the captured data and then stored. The extracted game traffic summary data is then categorized as described above. The extracted game traffic summary data (or information) still includes at least portions of the original captured data, some of which is eventually loaded into the automated simulation clients as described above and below.

In some embodiments, after the captured data has been categorized, the loading of one or more portions of the captured data into each automated simulation client may comprise loading at least a portion of the captured data corresponding to one or more of the types of actions into each automated simulation client. This means that the configuring of the behavior of each automated simulation client may comprise loading at least a portion of the captured data corresponding to one or more of the types of actions into each automated simulation client. Then during load testing, each of the one or more automated simulation clients performs one or more of the types of actions according to the corresponding portions of the captured data that it has received.

By categorizing the action or event type data, the system ends up more flexible. For example, in some embodiments some or all of the automated simulation clients can be configured to perform most or all of the types of actions performed by each automated simulation client's corresponding human user operated client. In some embodiments, some or all of the automated simulation clients can be configured to perform only some of the types of actions, such as for example nothing more than connect and disconnect. Varying the types of actions performed often adds different loads to the environment.

Referring back to FIG. 3, step 304 illustrates an example of how an automated simulation client can be configured to perform certain types of actions. Specifically, in step 304 a task list is sent to each of the one or more automated simulation clients. Each task list comprises one or more of the types of actions performed by any of the human user operated clients. In some embodiments, an automated simulation client's task list may comprise one or more of the types of actions performed by a human user operated client corresponding to the particular automated simulation client. During load testing, each of the one or more automated simulation clients performs the one or more types of actions in its task list according to corresponding portions of the captured data. In some embodiments, each task list is sent in response to a query by the corresponding automated simulation client.

Thus, in some embodiments, the behavior or profile of the automated simulation clients is defined by both a task list and portions of the captured data. The behavior or profile of an automated simulation client can be changed by changing its task list and/or portions of the captured data, but the underlying program code for the automated simulation client does not have to be modified or rewritten. Thus, the underlying program code for the automated simulation clients does not have to be modified or rewritten when load testing different online games or when running different load tests.

Figure 5:
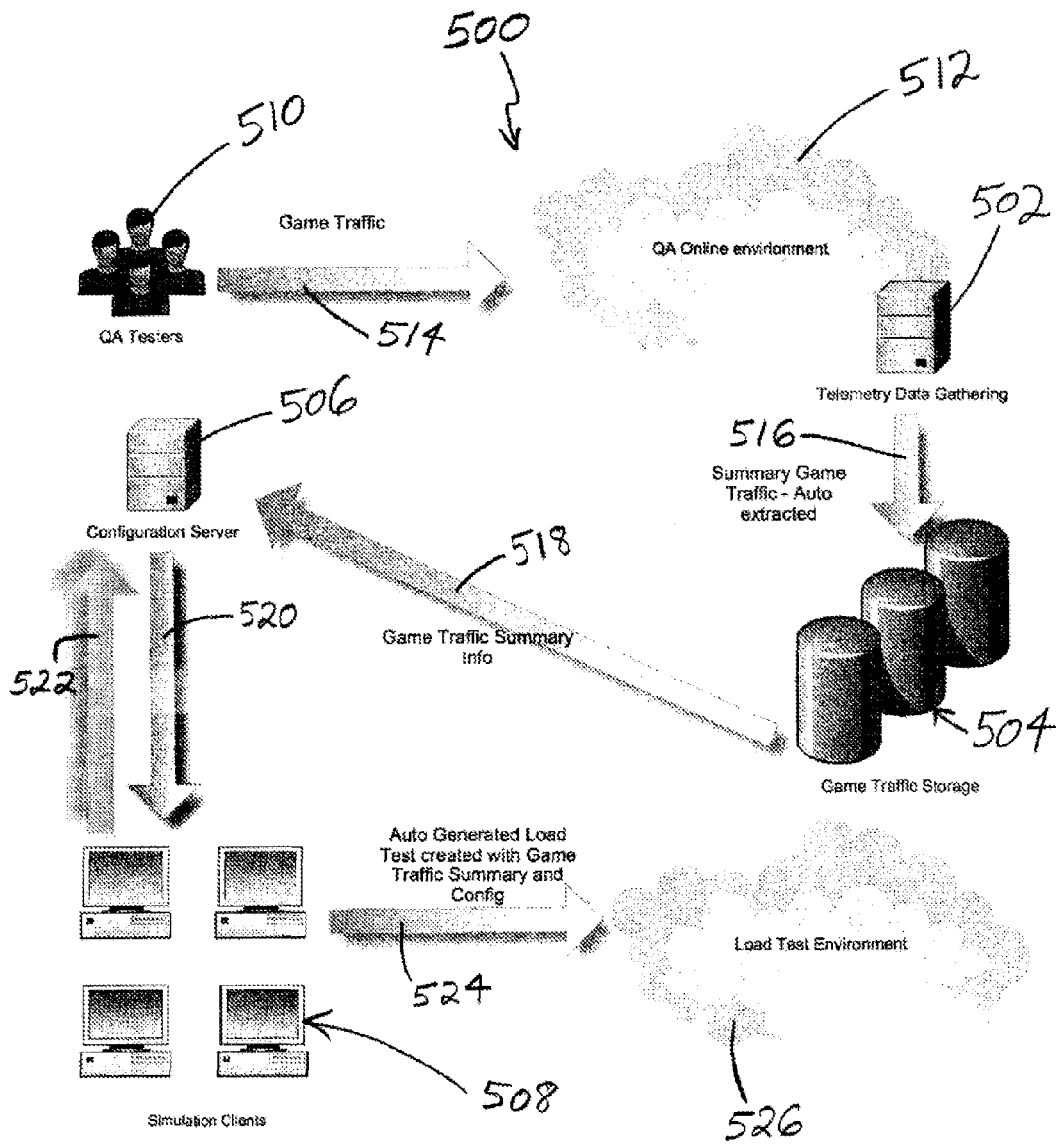
FIG. 5 is a block diagram illustrating a system in accordance with an embodiment of the present invention.

Referring to FIG. 5, there is illustrated an example of a system 500 in accordance with an embodiment of the present invention. The system 500 is one example of a system that may be used for implementing the methods and techniques described above and herein. In some embodiments, the system 500 automates load testing of online software applications, such as online games, based on any platform. For example, the system 500 may be used for load testing console driven online gaming, or online games that are run on any other platform, such as entertainment systems, desktop, laptop, and notebook computers, portable devices, etc.

The system 500 comprises a data capturing stage or server 502, which may also be referred to as a telemetry data gathering stage 502, a game traffic storage 504, a configuration stage or server 506, and one or more automated simulation clients 508. In some embodiments, the data capturing stage 502, the game traffic storage 504, the configuration stage 506, and the one or more automated simulation clients 508 may be implemented by one or more processor based apparatuses.

The data capturing stage 502 is configured to capture data that is representative of actions performed by each of a plurality of human user operated clients 510 as they interact with an online software application. For example, an online software application is run in which the plurality of human user operated clients 510 interact with the online software application. As mentioned above, a human user operated client refers to a client, such as a game console, computer, device, or other client, that is operated by a real human user or player. In the illustration, the online software application is run in the online environment 512, and the game traffic arrow 514 illustrates the human user operated clients 510 interacting with the online software application in the online environment 512.

Data is captured that is representative of the actions performed by each of the human user operated clients 510 during the running of the online software application. The data capturing may be referred to as telemetry data gathering. In some embodiments, the running of the online software application may comprise a quality assurance (QA) testing phase with the human user operated clients 510 being clients operated by human QA testers as shown. In some embodiments, the running of the online software application may comprise a beta testing phase with the human user operated clients 510 being clients operated by real human users participating in the beta testing phase. In some embodiments, a larger number of human user operated clients 510 may provide more accurate and/or realistic captured data. As such, a beta test may provide better data than a QA test since beta tests often have over a thousand players, whereas a QA test may only have 100 or so players. But any running of the online software application with human user operated clients 510 is acceptable. In some embodiments, the online software application may comprise an online game.

Thus, the data capturing stage 502 provides a means of capturing accurate real user data during real beta/quality testing phases, or during some other running of the software application in which real human users/players participate. That is, it allows testers to capture real game play data through a telemetry system that is used later to feed load test simulators.

In some embodiments, the system 500 also comprises a data categorization stage that is configured to categorize the captured data into types of actions performed by each of the human user operated clients, as described above. In some embodiments, the data categorization stage may be included in or with the data capturing stage 502, the game traffic storage 504, the configuration stage 506, or somewhere else. In some embodiments, the data categorization stage may be implemented by one or more processor based apparatuses.

One goal of the data categorization stage is to capture the key action or event sequences in a file after capturing the game play data via telemetry. Calls like Connect, Disconnect, Send Message, etc., are some examples of action sequence calls. That is, examples of action sequence calls may include <Connect>, <SendMessage>, including number of attributes, etc., similar to as described above.

In some embodiments, the file that includes the key action or event sequences is then uploaded to a storage server, such as the game traffic storage 504. In some embodiments, the format for this file may be XML. It is relatively easy to parse and validate XML. As such, XML provides a convenient format for writing load test specifications. Namely, XML tags can be correlated in a one to one mapping to a service class.

Thus, in some embodiments, during multiple beta, QA, or other runs of the software application, the results of many tests are stored in a central location, such as the game traffic storage 504. In some embodiments, summary game traffic data may be automatically extracted from the captured data prior to categorization and then stored in the game traffic storage 504, which is indicated by arrow 516. In some embodiments, the extracted summary game traffic data includes/comprises at least portions of the original captured data. As such, one or more portions of the original captured data is eventually loaded into the automated simulation clients 508.

Storing the results of many tests in the game traffic storage 504 allows aggregation of tests, etc. Additionally, in some embodiments, software title information is also stored so that tests can later be run specifically on a title, or with data aggregated across titles. And in some embodiments, the stored data is categorized into action or event types, such as connect, disconnect, game play, etc. By categorizing the action/event type data, the system ends up being more flexible. For example, as mentioned above, some automated simulation clients could be configured to do nothing but connect and disconnect, which often adds different load to the environment.

In some embodiments, the configuration stage or server 506 is configured to receive data that was captured during a running of an online software application. As described above, the captured data is representative of actions performed by each of a plurality of human user operated clients as they interacted with the online software application. Arrow 518 illustrates the configuration stage 506 receiving game traffic summary information, which includes at least portions of the captured data. Namely, as discussed above, in some embodiments the captured data is summarized before being categorized. In the illustrated embodiment, game traffic summary information was automatically extracted from the captured data and then stored in the game traffic storage 504. The game traffic summary information received by the configuration stage 506 includes at least portions of the original captured data, some of which is eventually loaded into the automated simulation clients 508.

Next, the configuration stage or server 506 is configured to load at least one or more portions of the captured data into the one or more automated simulation clients 508. Furthermore, in some embodiments, the configuration stage 506 may be further configured to send a task list to each of the one or more automated simulation clients 508. Arrow 520 illustrates the configuration stage 506 sending portions of the captured data and task lists to the one or more automated simulation clients 508. As mentioned above, each task list comprises one or more of the types of actions performed by any of the human user operated clients 510. One purpose of sending task lists and portions of the captured data to the automated simulation clients 508 is to configure the behavior of the automated simulation clients 508 and to configure the automated simulation clients 508 to perform certain types of actions. Thus, in some embodiments, portions of the recorded captured data are imported into each automated simulation client 508, and the recorded captured data defines the behavior or profile of each automated simulation client 508.

More specifically, in some embodiments, the behavior of each automated simulation client 508 may be configured via the captured load test data, as well as an XML action sequence. During operation, in some embodiments, each automated simulation client 508 queries the configuration stage or server 506, which is indicated by arrow 522. The configuration stage 506 determines which client behavior is desired, and sends a client task list. The run data is then queried to collect the appropriate captured data that is derived directly from the gathered QA/Beta data. The automated simulation client 508 is then ready to run. Namely, during load testing, each of the automated simulation clients 508 performs the one or more types of actions in its task list according to the corresponding portions of the captured data.

Thus, the stored captured data is automatically downloaded to the client simulations 508, and the client simulations 508 are also configurable allowing control of how the captured data is used. Namely, in some embodiments, the load test framework architecture simulates large scale simulation of a test run and accepts at each automated simulation client 508 an XML action or event sequence generated by the testing personnel and simulated data based off of the actual captured data gathered by the load test storage 504. A test can simulate multiple clients by simply using the configuration server 506 to specify different client behaviors. Individual client behaviors are mapped to appropriate sample data generated from the game traffic storage 504.

In some embodiments, the configuration stage 506 is further configured to send each task in response to a query by a corresponding automated simulation client 508, which again is indicated by arrow 522. In embodiments where the captured data has been categorized into types of actions, the configuration stage 506 is further configured to load at least a portion of the captured data corresponding to one or more of the types of actions into one or more of the automated simulation clients 508.

In some embodiments, the configuration stage 506 is further configured to multiply the one or more automated simulation clients 508 by a factor in order to produce additional automated simulation clients to simulate a greater load. That is, as discussed above, the number of automated simulation clients 508 used for load testing is scalable. Namely, the number of automated simulation clients 508 may be multiplied by any factor, such as for example 5×, 10×, 100×, 1000×, etc., in order to increase the number of automated simulation clients 508. In some embodiments, the configuration stage 506 is configured to automatically perform the process of multiplying/scaling the number of automated simulation clients 508.

As discussed above, the process of multiplying/scaling the number of automated simulation clients 508 may be linear or non-linear. In some embodiments, where the multiplying/scaling is non-linear, the configuration stage 506 is configured to automatically make changes in the behavior of the additional automated simulation clients by fine-tuning or tweaking portions of the captured data included in each additional automated simulation client. In some embodiments where the fine-tuning or tweaking is performed automatically, program code, modules, subroutines, or the like may be used to automatically make the changes to the captured data included in each additional automated simulation client during the multiplying/scaling process. By way of example, the changes may be predetermined changes, random changes, changes made according to an algorithm, etc.

The one or more automated simulation clients 508 are configured to perform load testing of an online server system. As mentioned above, in some embodiments, the behavior of each of the automated simulation clients 508 is configurable. For example, in some embodiments, an automatically generated load test is created by loading each automated simulation client 508 with one or more portions of captured game traffic summary data and action or event type sequence configuration data, as discussed above. This configures the behavior of each automated simulation client 508 by causing it to perform the specified action or event types according to the corresponding portions of the captured game traffic summary data. As mentioned above, in some embodiments, the captured game traffic summary data comprises one or more portions of the original captured data.

In some embodiments, the one or more automated simulation clients 508 are further configured to interact with an online software application during load testing. This facilitates load testing of the online server system that supports and/or runs the online software application. As such, and as indicated by arrow 524, the automated simulation clients 508 enter a load test environment 526 where they interact with the online software application during load testing. As mentioned above, in some embodiments, the online software application may comprise an online game.

In some embodiments, the one or more automated simulation clients 508 are each further configured to perform one or more of the types of categorized actions or events according to the corresponding portions of the captured data. Similarly, in some embodiments, the one or more automated simulation clients 508 are each further configured to perform the one or more types of actions in its task list according to the corresponding portions of the captured data. Thus, in some embodiments, the one or more automated simulation clients 508 are configured to perform the load testing by performing actions or events according to the captured data. As such, as the automated simulation clients 508 interact with the online software application during load testing, they perform actions or events according to the captured data, which means they are capable of performing the actions or events in the same or substantially same manner that they were performed by the real human user operated clients.

The ability to configure the behavior of the automated simulation clients 508 through the use of task lists having action or event type sequence configuration data, and the appropriate portions of captured data from real human users, automates the creation of complex and general test scenarios. The testing personnel are able to create and run any sequence of test actions involving the services of the game server. This allows a range of different types of tests to be performed, such as for example, soak tests, stress tests, denial of service attacks, etc. Furthermore, the tests are reproducible and accurate. And the behavior of an automated simulation client can be changed by changing its task list and/or portions of the captured data, but the underlying program code for the automated simulation client does not have to be modified or rewritten for load testing different online games or when running different load tests.

In some embodiments, the load testing system includes a graphical user interface (GUI). Tests can be fed directly to the load test framework with the graphical user interface, and the results of the load testing can be viewed through the graphical user interface. In some embodiments, the system further allows the addition of key performance indicators (KPIs) without the need for server restarts during the course of load testing, thereby allowing one to study the effects on the server and predict behavior of the server under heavy load.

In some embodiments, the system 500 automates the process of aggregating, processing, and feeding the captured data through a "load simulator" with easy variation of key parameters (such as number of players, etc.) to simulate greater loads (e.g. 5×, 10×, 100×, 1000×) on online server sets due to higher player concurrency during online gaming or use of another type of online software application. In embodiments where the online software application comprises an online game, one goal of the present system is that any tester working on a game title would be able to leverage this system to get feedback from the results. For example, the tester would be able to adjust the game code to "qualify" it for online play (i.e. to run within established normal/prescribed parameters) without necessarily having intricate knowledge of the game code written by the console developer.

Figure 6:
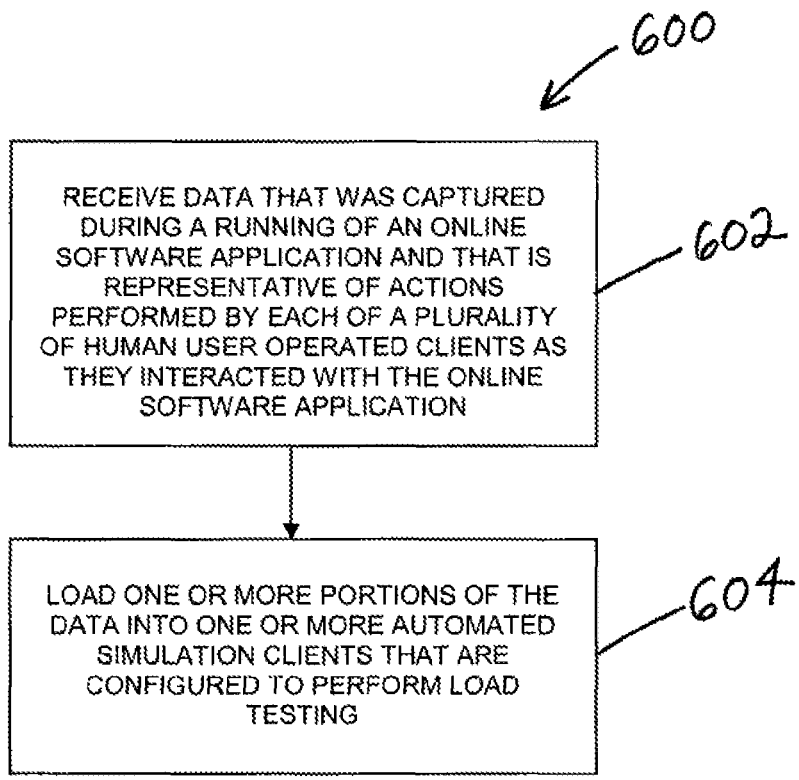
FIG. 6 is a flow diagram illustrating a method in accordance with an embodiment of the present invention.

Referring to FIG. 6, there is illustrated a method 600 in accordance with an embodiment of the present invention. In some embodiments, the method 600 may be implemented and/or run by the configuration stage or server 506 (FIG. 5). In some embodiments, the method 600 (FIG. 6) may be implemented by one or more computer programs stored on a computer readable storage medium.

The method 600 begins in step 602 in which data is received that was captured during a running of an online software application. As discussed above, the captured data is representative of actions performed by each of a plurality of human user operated clients as they interacted with the online software application. In step 604, at least one or more portions of the data are loaded into one or more automated simulation clients that are configured to perform load testing of an online server system.

In some embodiments, the method 600 may further include any additional steps, features, or methods described above. For example, in some embodiments, the method 600 may further include the multiplying/scaling feature described above.

As mentioned above, embodiments of the present invention are intended to simplify the task of performing load tests on a game server. Currently, the task of load-testing remains somewhat difficult, as developers have to use tools that are hard to work with, or use scripting languages that they may not be familiar with. These factors have resulted in a lack of accurate or acceptable load-testing thus far.

The following discussion provides further detail regarding an example of one embodiment of the present invention. Specifically, a Load Test Framework (LTF) in accordance with an embodiment of the present invention will be described that is intended to simplify the task of performing load tests on a game server. In some embodiments, the game server may comprise a Distributed Memory Engine (DME) game server, and the Load Test Framework may comprise a DME Load Test Framework (DLTF), which is what is described in the following discussion. It should be understood, however, that the use of DME is not required.

The framework allows testers to create load test clients quickly and easily. It is believed that if load testing remains more complex than the original code development, it will not get done. The framework also allows arbitrarily complex and general test scenarios to be created. In some embodiments, a tester is able to create and run almost any sequence of test actions involving the services of the DME, so that a range of different types of tests can be performed, such as soak tests, stress tests, and denial of service attacks.

In some embodiments, the framework allows tests to be reproducible. In contrast, some tools generate loads according to some random method. Thus, two consecutive runs of the same test are not identical. If a programmer makes code changes in response to problems found during load testing, it is helpful for the same test to be run after the changes are in place in order to verify and measure the efficacy of the proposed changes.

In some embodiments, the framework is compatible with one or more systems for running or for providing large scale simulations. Thus, in some embodiments, the framework eases the creation of load test clients, and then those clients may be run within large-scale simulations using such systems.

An example embodiment of a Load-Test Framework for a DME Game Server will now be described. First, the overall design of the framework will be described and how testers use it to create load tests. Then, how the framework takes the test specification and creates a client that executes that test will be described. Again, it should be understood that the following system is just one example embodiment of the present invention and that the use of DME is not required.

A high-level overview of the framework architecture design will now be provided. As mentioned above, some embodiments of the present invention does not require load-testers to write any code, which allows testers to create load test clients as quickly and easily as possible. Rather, the tester simply creates a file of "action sequences" that specifies what should be done, and in what order, but not how. Each action is one of a handful of services that the DME provides, such as, "connect", "disconnect", "send message", and a few others. Some of these may require additional parameters, in some embodiments.

In some embodiments, the file of action sequences is parsed and validated. In some embodiments, XML may be used for this purpose. Thus, in some embodiments, load test specifications are written as XML action-sequence files.

In some embodiments, the DLTF itself includes two classes. The first class is a LoadTestCreator, which creates a test object that models the action sequence described in the XML file mentioned above. This class may make use of the plug-in classes described below. The second class is a LoadTestRunner, which first loads the XML file into a Document Object Model (DOM) document object, and then uses the LoadTestCreator to create the test object. Finally, it initiates execution of the action sequence.

In some embodiments, additional plug-in classes, one per DME service, are created. In some embodiments, each class encapsulates the algorithm, Application Programming Interface (API) calls, calls for a metrics and monitoring dashboard tool or system, and all other details that implement a service. Thus, all the low-level logic is completely hidden from the tester.

Figure 7:
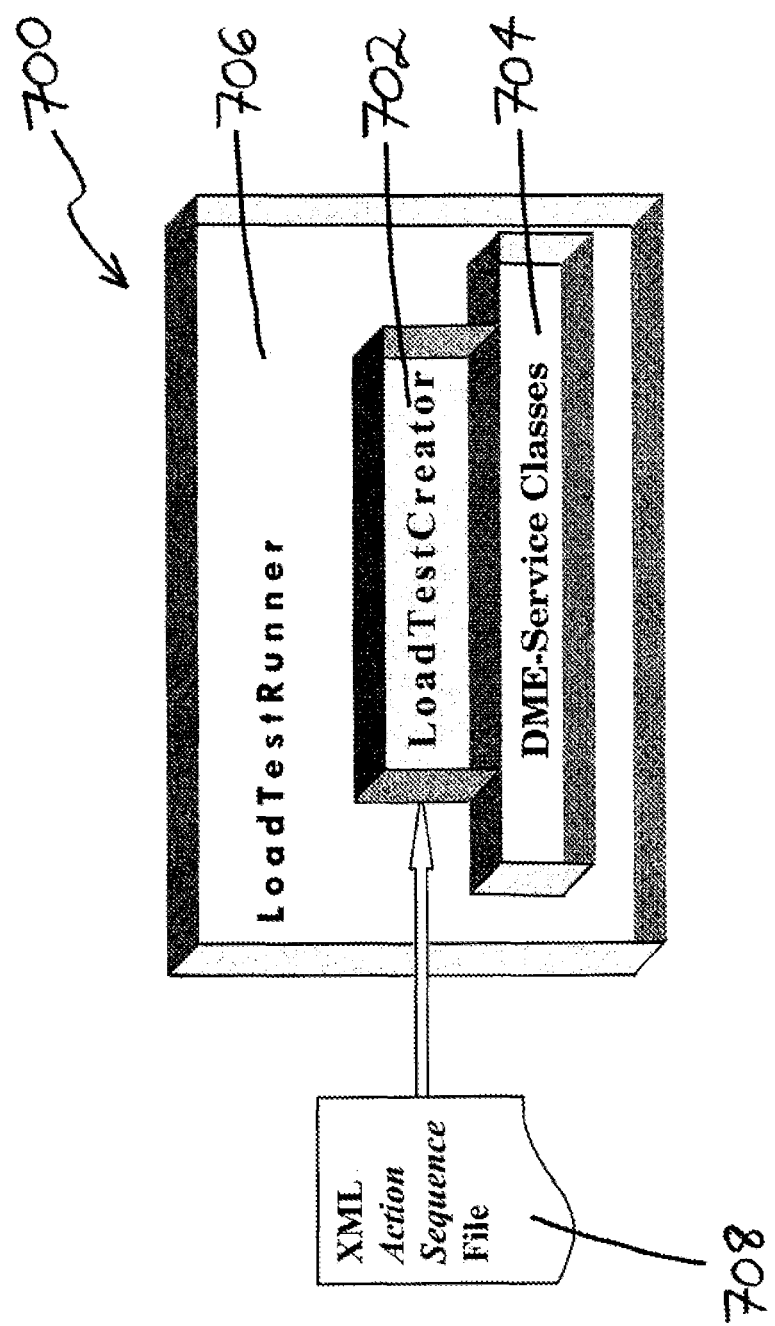
FIG. 7 is a block diagram illustrating a framework architecture in accordance with an embodiment of the present invention.

FIG. 7 illustrates a high-level design of a DME Load-Test Framework architecture 700 in accordance with an embodiment of the present invention. The DLTF includes a LoadTestCreator 702 class, which builds a load-test client object using the DME-Service classes 704 collection. The LoadTestRunner 706 controls creation of the test object and the invocation of the test-action sequence 708.

In some embodiments, the framework works as follows. There is a 1-to-1 mapping between classes in the DME-service Classes Collection and the valid tags that can be specified in the XML file. In other words, each DME service will be encapsulated in a class, and will have a corresponding tag in the XML action-sequence file 708. In some embodiments, the encapsulating class has a small public interface, thus hiding all the implementation details.

In some embodiments, the LoadTestCreator class constructs a run-time object which represents the action sequence described in the file. This run-time object is actually a composite object, whose design facilitates the run-time behavior described next.

Once constructed, the run-time object's "action" method is then called, in some embodiments. This initiates a chain of polymorphic calls to each action method for all the other actions in the sequence, resulting in execution of the overall test sequence.

In some embodiments, a large-scale simulation may be created simply by passing the main program (LoadTestRunner) along with the XML action-sequence file to a system that runs or provides for large scale simulations. In fact, since some such systems allow the tester to specify a simulation using multiple different clients, a more general simulation can be performed by passing to it multiple instances of the same main program, along with a different action-sequence XML file for each one.

The following discussion provides further details regarding how to specify load tests via XML files. Namely, the following discussion explains one example embodiment of how to extract game data hitting a DME game server, which is indicated by arrows 516 and 518 in FIG. 5. In some embodiments, the DME can be changed to be sample server/service to load test. In some embodiments, load test descriptions can be specified by a tester by creating an XML file known as the Action Sequence file. In some embodiments, the valid tags for this XML file are: <connect>; <sendmessage>; <createtokens>; <creategameobjects>; <disconnect>; <repeat>; and <wait>. In some embodiments, this list may be expanded or reduced. In some embodiments, each tag will also have attributes. The number of attributes and their names may be varied.

An example embodiment of a DME_SERVICE class hierarchy will now be discussed. In some embodiments, the class DME_SERVICE is abstract. Each service provided by DME will be implemented in a derived concrete class.

Figure 8:
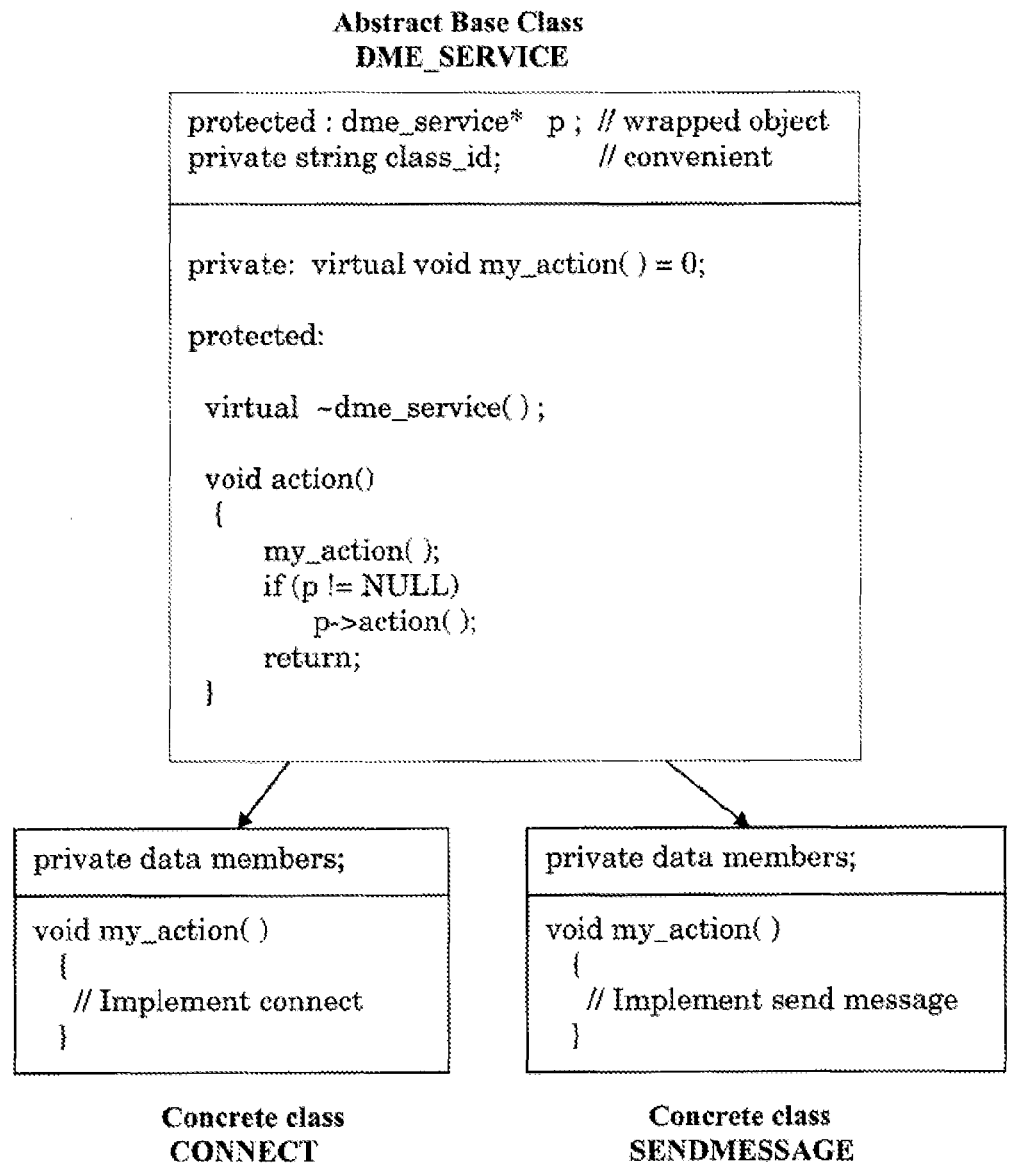
FIG. 8 is an inheritance hierarchy diagram illustrating service classes in accordance with an embodiment of the present invention.

FIG. 8 illustrates an inheritance hierarchy diagram for the DME-service classes in accordance with an embodiment of the present invention (other concrete classes not shown). Two other concrete classes which are useful to have in some embodiments are REPEAT and WAIT. Even though they are not "DME services" per se, they are of the same type as all the other concrete classes (this is one of the points of the OO design pattern Decorator, discussed further below).

FIG. 9 illustrates an example of the REPEAT class and WAIT class in accordance with an embodiment of the present invention. The REPEAT class allows a tester to specify a sequence of actions to be repeated. The WAIT class allows a tester to specify a delay between actions.

An example embodiment of a composite "Test-Sequence" object will now be discussed. Namely, the following discussion explains an example embodiment of how the configuration occurs in the configuration server 506 in FIG. 5, where the data is "repeated" n times to create a load test simulation client, and then fed into the load test framework tool, which is indicated by arrow 520. In some embodiments, this component in the framework is based on the OO Design Pattern Decorator, which advocates the principle of favoring composition over inheritance. Doing so provides an easy way to model any arbitrary test sequence specification, and avoids the type of "class explosion" that can happen otherwise.

Furthermore, in some embodiments this design is extensible with minimal code changes to the framework. If a new service is added to the DME, all that is required is to implement a corresponding concrete class that implements the service, and a few additional lines of code in the LoadTestCreator class (see below) to build such an object.

Figure 10:
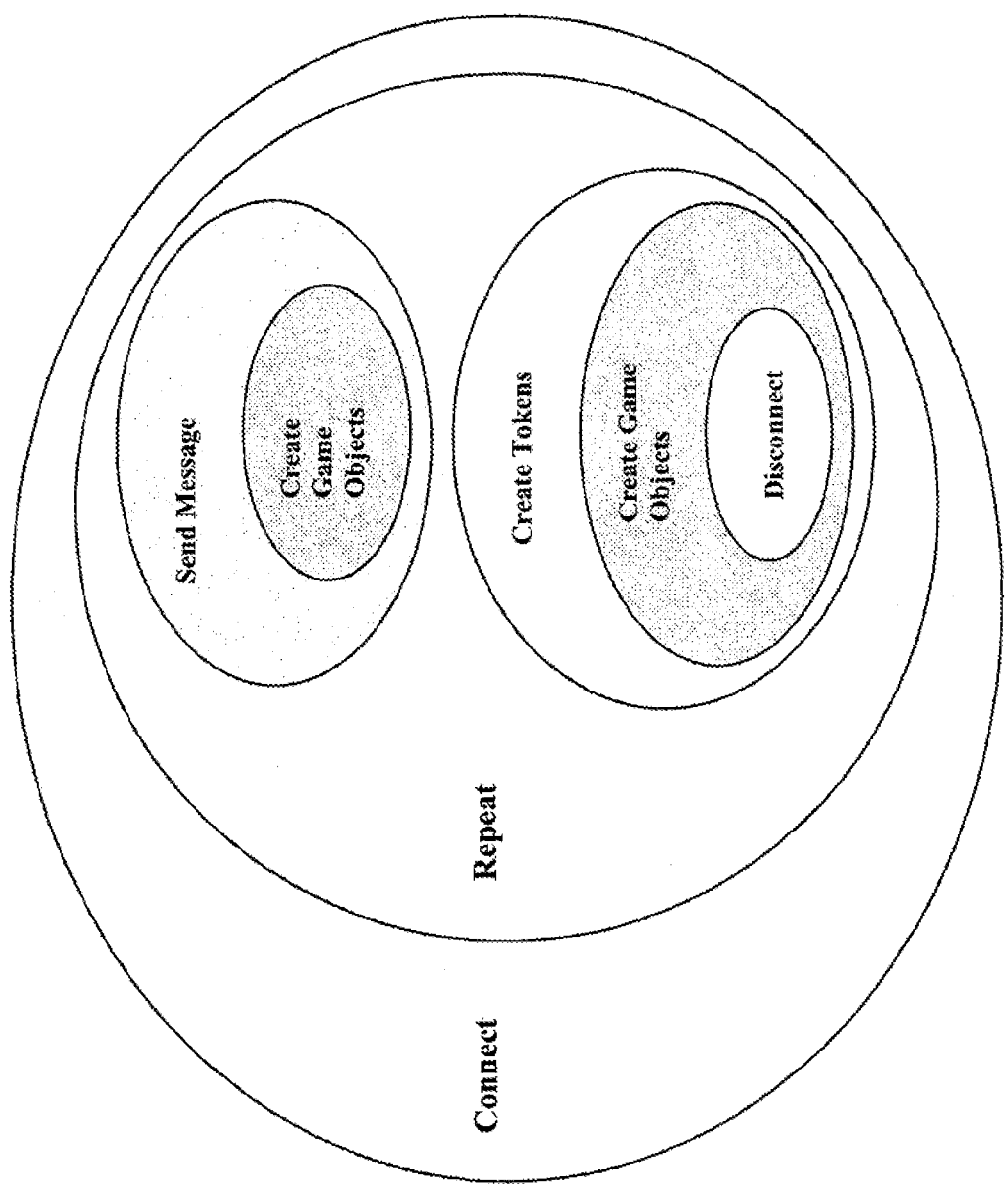
FIG. 10 is a diagram illustrating an example of a composite load-test object in accordance with an embodiment of the present invention.

FIG. 10 illustrates an example of a composite load-test object in accordance with an embodiment of the present invention. In some embodiments, the test scenario is as follows:

1. Connect
2. Repeat n times
    a. Send message
    b. Create Game Objects
3. Create Tokens
4. Create Game Objects
5. Disconnect In some embodiments, the composite load-test object is created at run-time. Each DME service object is configured with the attributes supplied in the XML tag.

An example embodiment of the LoadTestCreator class will now be discussed. In some embodiments, the LoadTestCreator class contains one public static method, which implements the OO design pattern Factory. That is, whenever called, it returns a concrete subclass of the abstract class DME service.

Note that the factory method is recursive, as this implementation allows the composite object to be built easily. Since in some embodiments each concrete DME-service class is a wrapper around another such class, a recursive call to the factory is made in order to construct the wrapped object first, whose returned pointer is then passed as a parameter into the constructor of the wrapper DME-service object.

In some embodiments, in the case of the REPEAT object, two recursive calls are made, as this object wraps two other objects—the action sequence to be repeated, and the action sequence to follow. As before, the returned pointers to the composite objects are passed into the constructor.

An example portion of pseudo-code for the purpose of illustrating an example embodiment of the LoadTestCreator class is as follows.

```
class LoadTestCreator {
public:
    static DME_service* DME_Service_Factory
            (Object Document Node *node)
    {
        dme_service *d = null;
        if (node == null)
            return d;
        type = nodetype(node);
        if (type == "connect")
        {
            arg1 = get attribute #1 ;
            arg2 = get attribute #2 ;
            d = new DME_service_connect(arg1,arg2,
                    DME_Service_Factory(get_sibling(node));
        }
        else if (type == "sendmessage")
        {
            arg1 = get attribute #1 ;
            arg2 = get attribute #2 ;
            arg3 = get attribute #3;
            d = new DME_service_sendmessage(arg1,arg2,arg3,
                    DME_Service_Factory(get_sibling(node));
        }
        else if (type == "repeat")
        {
            arg1 = get attribute #1 ;
            d = new DME_service_repeat(arg1,
                    DME_Service_Factory(get_child(node)),
                    DME_Service_Factory(get_sibling(node));
        }
        else if
```

```
        {
            // Code for the other DME-services
        }
        else print error;
        return (d);
    }
};
```

It should be understood that the above portion of pseudo-code is just one example and that the LoadTestCreator class may be implemented in many different ways with many different versions of code.

An example embodiment of the LoadTestRunner class will now be discussed. In some embodiments, the LoadTestRunner is the test driver. In some embodiments, it loads the XML action-sequence file in a DOM object, and then invokes the LoadTestCreator's DME_Service_Factory to create the composite test object. One example pseudo-code implementation may look like the following.

```
DOM doc = load_xmlfile (filename);
rootnode = get_rootnode(doc);
DME_SERVICE *dme_service =
    LoadTestCreator::DME_Service_Factory (get_child(rootnode));
dme_service->action( ) ;
```

In some embodiments, when the LoadTestRunner invokes the action method of the composite test object, it initiates a chain of polymorphic actions. The outermost wrapper object first performs its own service, by calling its private my_action method, and then invokes the action method of the object that it wraps. This process is repeated until the innermost wrapped object is reached, at which point the processing stops.

In some embodiments, the REPEAT object has a slightly different action method, which first repeats calls to the action method of the object that it wraps, and then invokes the action method of the next object in the test sequence.

The result is a chain of polymorphic calls to the concrete classes' action method, which performs the requested service. In some embodiments, it corresponds in exact sequence to the test scenario specified in the XML file.

Running large scale simulations will now be discussed. Namely, in some embodiments the above-described framework is integrated with a system for running or for providing large scale simulations. In some embodiments, the LoadTestRunner executable is the actual test client. In some embodiments, there is no new code that the load-tester has to write or compile. The tester just writes the XML action-sequence file, and provides the system for running large scale simulations with the LoadTestRunner executable along with that XML file as a "config" file, and the rest is done automatically.

Since some systems for running large scale simulations allow the user to specify different test clients to be run simultaneously as part of a large-scale simulation, to achieve this, in some embodiments, it is just necessary to provide multiple copies of the LoadTestRunner executable to the system, each one configured with its own XML action-sequence file.

In some embodiments, the results may be evaluated using a metrics and monitoring dashboard tool or system. In some embodiments, in order to view metrics in such a tool or system, each DME-service class can add the needed client logic as part of the implementation details of the algorithm being implemented. Any common functionality that can be re-used by different classes will be encapsulated in a separate class, which will have a simple public interface, thus shielding the developer of the DME-service classes from the details of using the metrics and monitoring tool or system.

Thus, an example implementation of a load testing framework in accordance with an embodiment of the present invention has been described above which will allow anyone to easily create and run load tests. In some embodiments, the framework uses encapsulation, inheritance, and polymorphism, as well as some basic OO design patterns such as Factory and Decorator. In some embodiments, this framework meets the major goals described above and below. In some embodiments, a tag may be used that allows other XML test files to be read in. This will allow a tester to build up large-scale tests from smaller ones more easily. In some embodiments, a Graphical User Interface (GUI) front-end may be used to allow easy creation of the XML files (tags and attributes).

Thus, the above discussion has described methods, techniques, and systems that automate load testing simulation for online software applications, such as online games. Previous methods for load testing a game for online play are typically broken up into many disconnected manual processes and can be as complex as the software title development process itself. Load testing is important to ensure properties such as predictable performance, continuous availability, end-to-end dependability, and scalability meet required standards. Embodiments of the methods and techniques described herein allow one to automate load testing of online software applications, such as online games. Some embodiments allow testers to capture real game play data through a telemetry system to feed load test simulators. Some embodiments automate the creation of complex and general test scenarios and can run any sequence of test actions involving the services of the game server. Some embodiments allow for the scaling of automated simulation clients in order to produce additional automated simulation clients to simulate a greater load. Such features allow a range of different types of tests to be performed, such as soak tests, stress tests, denial of service attacks, etc. Tests are reproducible and accurate and can be fed directly to the load test framework with a graphical user interface.

Figure 11:
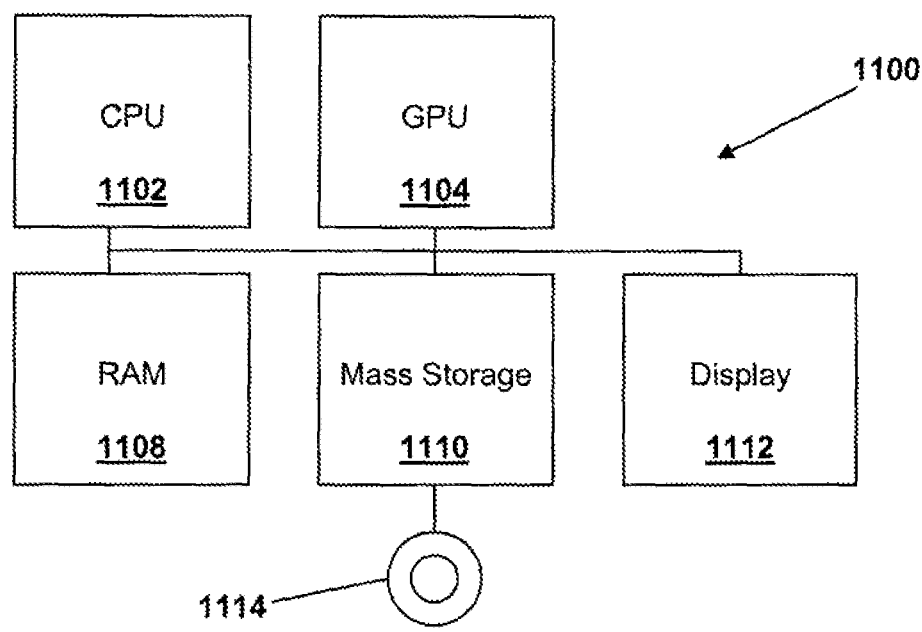
FIG. 11 is a block diagram illustrating a computer or other processor based apparatus/system that may be used to run, implement and/or execute any of the methods and techniques shown and described herein in accordance with the embodiments of the present invention.

The methods and techniques described herein may be utilized, implemented and/or run on many different types of processor based apparatuses or systems. Referring to FIG. 11, there is illustrated an example of a processor based apparatus or system 1100 that may be used for any such implementations. One or more components of the processor based apparatus or system 1100 may be used for implementing any system or device mentioned above, such as for example any of the above-mentioned computers, game consoles, entertainment systems, clients, servers, automated simulation clients, etc. However, the use of the processor based apparatus or system 1100 or any portion thereof is certainly not required.

By way of example, the system 1100 may include, but is not required to include, a central processing unit (CPU) 1102, a graphics processing unit (GPU) 1104, a random access memory (RAM) 1108, and a mass storage unit 1110, such as a disk drive. The system 1100 may be coupled to, or integrated with, any of the other components described herein, such as a display 1112. The system 1100 comprises an example of a processor based apparatus or system. The CPU 1102 and/or GPU 1104 may be used to execute or assist in executing the steps of the methods and techniques described herein, and various program content, images, menu screens, video games, virtual worlds, test results, graphical user interface (GUI), etc., may be rendered on the display 1112.

The mass storage unit 1110 may include or comprise any type of computer readable storage or recording medium or media. The computer readable storage or recording medium or media may be fixed in the mass storage unit 1110, or the mass storage unit 1110 may optionally include removable storage media 1114, such as a digital video disk (DVD), Blu-ray disc, compact disk (CD), USB storage device, floppy disk, or other media. By way of example, the mass storage unit 1110 may comprise a disk drive, a hard disk drive, flash memory device, USB storage device, Blu-ray disc drive, DVD drive, CD drive, floppy disk drive, etc. The mass storage unit 1110 or removable storage media 1114 may be used for storing code or macros that implement the methods and techniques described herein.

Thus, removable storage media 1114 may optionally be used with the mass storage unit 1110, which may be used for storing program or computer code that implements the methods and techniques described herein, such as program code for running the above-described methods and techniques for load testing. However, any of the storage devices, such as the RAM 1108 or mass storage unit 1110, may be used for storing such code. For example, any of such storage devices may serve as a tangible computer readable storage medium for storing or embodying a computer program or software application for causing a console, system, computer, client, server, or other processor based apparatus or system to execute or perform the steps of any of the methods, code, and/or techniques described herein. Furthermore, any of the storage devices, such as the RAM 1108 or mass storage unit 1110, may be used for storing any needed database(s).

In some embodiments, one or more of the embodiments, methods, approaches, and/or techniques described above may be implemented in one or more computer programs or software applications executable by a processor based apparatus or system. By way of example, such processor based system may comprise the processor based apparatus or system 1100, or a computer, entertainment system, game console, graphics workstation, server, client, etc. Such computer program(s) may be used for executing various steps and/or features of the above-described methods and/or techniques. That is, the computer program(s) may be adapted to cause or configure a processor based apparatus or system to execute and achieve the functions described above. For example, such computer program(s) may be used for implementing any embodiment of the above-described steps or techniques for load testing, capturing data, running online software applications, running online games, generating a graphical user interface (GUI), etc. As another example, such computer program(s) may be used for implementing any type of tool or similar utility that uses any one or more of the above described embodiments, methods, approaches, and/or techniques. In some embodiments, one or more such computer programs may comprise a video game, role-playing game (RPG), other computer simulation, or system software such as an operating system, BIOS, macro, or other utility. In some embodiments, program code macros, modules, loops, subroutines, calls, etc., within or without the computer program(s) may be used for executing various steps and/or features of the above-described methods and/or techniques. In some embodiments, the computer program(s) may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more computer readable storage mediums storing one or more computer programs adapted to cause a processor based apparatus or system to execute steps comprising: capturing data that is representative of actions performed by each of a plurality of human user operated clients as they interact with an online software application; loading at least one or more portions of the captured data into one or more automated simulation clients; and using the one or more automated simulation clients to perform load testing of an online server system.

As another example, in some embodiments the present invention provides a computer readable storage medium storing one or more computer programs adapted to cause a processor based apparatus or system to execute steps comprising: receiving data that was captured during a running of an online software application and that is representative of actions performed by each of a plurality of human user operated clients as they interacted with the online software application; and loading at least one or more portions of the data into one or more automated simulation clients that are configured to perform load testing of an online server system.

While the invention herein disclosed has been described by means of specific embodiments and applications thereof, numerous modifications and variations could be made thereto by those skilled in the art without departing from the scope of the invention set forth in the claims.

What is claimed is:

1. A method, comprising:
 capturing data that is representative of actions performed by each of a plurality of human user operated clients as they interact with an online software application, wherein the capturing data is performed by one or more processor based apparatuses;
 loading at least one or more portions of the captured data into one or more automated simulation clients; and
 using the one or more automated simulation clients to perform load testing of an online server system.

2. The method of claim 1, further comprising:
 categorizing the captured data into types of actions performed by each of the human user operated clients.

3. The method of claim 2, wherein the loading at least one or more portions of the captured data into one or more automated simulation clients comprises:
 loading at least a portion of the captured data corresponding to one or more of the types of actions into a first of the one or more automated simulation clients.

4. The method of claim 2, wherein the using the one or more automated simulation clients to perform load testing of an online server system comprises:
 causing each of the one or more automated simulation clients to perform one or more of the types of actions according to corresponding portions of the captured data.

5. The method of claim 1, further comprising:
 sending a task list to each of the one or more automated simulation clients, wherein each task list comprises one or more types of actions performed by any of the human user operated clients.

6. The method of claim 5, wherein the using the one or more automated simulation clients to perform load testing of an online server system comprises:

causing each of the one or more automated simulation clients to perform the one or more types of actions in its task list according to corresponding portions of the captured data.

7. The method of claim 5, wherein each task list is sent in response to a query by a corresponding automated simulation client.

8. The method of claim 1, wherein the using the one or more automated simulation clients to perform load testing of an online server system comprises:
multiplying the one or more automated simulation clients by a factor in order to produce additional automated simulation clients to simulate a greater load.

9. The method of claim 8, wherein the multiplying comprises linear multiplying.

10. The method of claim 8, wherein the multiplying comprises non-linear multiplying.

11. The method of claim 1, wherein the using the one or more automated simulation clients to perform load testing of an online server system comprises:
running the online software application with the one or more automated simulation clients interacting with the online software application.

12. The method of claim 1, wherein the online software application comprises an online game.

13. The method of claim 1, wherein using the one or more automated simulation clients to perform load testing of the online server system comprises placing a load on the online server system beyond a normal usage pattern to test the online server system's response at high loads.

14. The method of claim 1, wherein the one or more automated simulation clients simulate actions of one or more human user operated clients based on the captured data of the plurality of human operated clients.

15. A system, comprising:
a data capturing stage that is configured to capture data that is representative of actions performed by each of a plurality of human user operated clients as they interact with an online software application;
one or more automated simulation clients that are configured to perform load testing of an online server system; and
a configuration stage that is configured to load at least one or more portions of the captured data into the one or more automated simulation clients;
wherein the data capturing stage, the one or more automated simulation clients, and the configuration stage are implemented by one or more processor based apparatuses.

16. The system of claim 15, further comprising:
a data categorization stage configured to categorize the captured data into types of actions performed by each of the human user operated clients.

17. The system of claim 16, wherein the configuration stage is further configured to load at least a portion of the captured data corresponding to one or more of the types of actions into a first of the one or more automated simulation clients.

18. The system of claim 16, wherein the one or more automated simulation clients are further configured to perform one or more of the types of actions according to corresponding portions of the captured data.

19. The system of claim 15, wherein the configuration stage is further configured to send a task list to each of the one or more automated simulation clients, wherein each task list comprises one or more types of actions performed by any of the human user operated clients.

20. The system of claim 19, wherein the one or more automated simulation clients are each further configured to perform the one or more types of actions in its task list according to corresponding portions of the captured data.

21. The system of claim 19, wherein the configuration stage is further configured to send each task in response to a query by a corresponding automated simulation client.

22. The system of claim 15, wherein the configuration stage is further configured to multiply the one or more automated simulation clients by a factor in order to produce additional automated simulation clients to simulate a greater load.

23. The system of claim 15, wherein the one or more automated simulation clients are further configured to interact with the online software application during load testing.

24. The system of claim 15, wherein the online software application comprises an online game.

25. One or more computer readable storage mediums storing one or more computer programs that will cause a processor based system to execute steps comprising:
capturing data that is representative of actions performed by each of a plurality of human user operated clients as they interact with an online software application;
loading at least one or more portions of the captured data into one or more automated simulation clients; and
using the one or more automated simulation clients to perform load testing of an online server system.

26. A computer readable storage medium storing one or more computer programs that will cause a processor based system to execute steps comprising:
receiving data that was captured during a running of an online software application and that is representative of actions performed by each of a plurality of human user operated clients as they interacted with the online software application; and
loading at least one or more portions of the data into one or more automated simulation clients that are configured to perform load testing of an online server system.

27. The computer readable storage medium of claim 26, wherein:
the data is categorized into types of actions performed by each of the human user operated clients; and
the loading at least one or more portions of the data into one or more automated simulation clients comprises loading at least a portion of the captured data corresponding to one or more of the types of actions into a first of the one or more automated simulation clients.

28. The computer readable storage medium of claim 26, wherein the one or more computer programs will further cause the processor based system to execute steps comprising:
sending a task list to each of the one or more automated simulation clients, wherein each task list comprises one or more types of actions performed by any of the human user operated clients.

29. The computer readable storage medium of claim 28, wherein each task list is sent in response to a query by a corresponding automated simulation client.

30. The computer readable storage medium of claim 26, wherein the one or more computer programs will further cause the processor based system to execute steps comprising:
multiplying the one or more automated simulation clients by a factor in order to produce additional automated simulation clients to simulate a greater load.

31. The computer readable storage medium of claim 30, wherein the multiplying comprises linear multiplying.

32. The computer readable storage medium of claim 30, wherein the multiplying comprises non-linear multiplying.

33. The computer readable storage medium of claim 26, wherein the online software application comprises an online game.

* * * * *